United States Patent [19]

Fatheree

[11] Patent Number: 5,013,015

[45] Date of Patent: May 7, 1991

[54] MECHANICALLY ACTUATED SWING CLAMP

[75] Inventor: John D. Fatheree, Benbrook, Tex.

[73] Assignee: General Dynamics Corporation, Fort Worth, Tex.

[21] Appl. No.: 536,437

[22] Filed: Jun. 11, 1990

[51] Int. Cl.⁵ .............................................. B23Q 3/08

[52] U.S. Cl. ...................................... 269/24; 269/32; 269/91; 269/27

[58] Field of Search ................................ 269/91-94, 269/27, 24, 32, 246, 250

[56] References Cited

U.S. PATENT DOCUMENTS

| | | | |
|---|---|---|---|
| 1,801,222 | 4/1931 | Cayo | 269/93 |
| 2,650,523 | 9/1953 | Zwick | 269/91 |
| 3,397,879 | 8/1968 | Morawski et al. | 269/91 |
| 3,572,216 | 3/1971 | Seesody . | |
| 3,948,502 | 4/1976 | Waller et al. . | |
| 4,508,327 | 4/1985 | Ersoy . | |

FOREIGN PATENT DOCUMENTS

| | | | |
|---|---|---|---|
| 466275 | 7/1950 | Canada | 269/91 |

*Primary Examiner*—Robert C. Watson
*Attorney, Agent, or Firm*—James E. Bradley

[57] ABSTRACT

A swing clamp for clamping work pieces to a fixture is mechanically actuated. The clamp has a body with a base. The base has a threaded hole in it. A mandrel is carried by the body. A clamp member is mounted to one end of the mandrel. A shaft extends through the mandrel and engages a threaded hole in the base. A translational device changes rotational movement of the shaft to linear movement of the mandrel. A guide causes the mandrel to swing about 90 degrees during this linear movement. This releases and actuates the clamp member.

13 Claims, 3 Drawing Sheets

MECHANICALLY ACTUATED SWING CLAMP

This invention was made with Government support under Contract No. F33615-83-C-5079 awarded by Department of the Air Force. The Government has certain rights in this invention.

BACKGROUND OF THE INVENTION

1. Field of the Invention

This invention relates in general to devices for clamping work pieces for machining operations, and in particular to a swing clamp that will rotate 90 degrees between a released and a clamped position.

2. Description of the Prior Art

Swing clamps are used in various manufacturing operations, particularly machining. The swing clamp of the prior art has a cam sleeve with a cam slot. A cam pin extends outward from a mandrel and engages the cam slot. A hydraulic piston moves the mandrel axially relative to the cam sleeve. The cam slot and cam pin cause the mandrel to rotate during this axial movement. This causes the clamp to swing as it moves between the lower engaged position and an upward released position.

The prior devices have a disadvantage particularly in manufacturing operations where an operator is not in attendance. The work pieces will be clamped to fixtures. The fixtures are moved automatically from a remote loading station to the machine tool and to other devices, such as inspection devices and washing stations. The physical connection between the swing clamp of the prior art and the hydraulic power source cannot be maintained during these movements. The lack of an operator precludes the connection of the hydraulic power source to the clamp of the machine tool. Therefore, the clamp cannot be released and actuated on the bed of the machine tool during the machining process.

SUMMARY OF THE INVENTION

In this invention, the swing clamp is actuated mechanically. It does not have a hydraulic piston for moving a mandrel, therefore needs no hydraulic connections. The swing clamp has a body with a base and a threaded hole in it. A mandrel is carried by the body. A clamp member extends radially outward from the upper end of the mandrel.

A shaft extends through a bore within the mandrel. The shaft has a threaded end which engages the threaded hole in the base. The shaft can rotate relative to the mandrel.

A translational device will cause rotation of the shaft to impart an axial movement to the mandrel. A guide, particularly a cam sleeve and cam slot, causes the mandrel to swing as it moves axially due to shaft rotation.

In the preferred embodiment, the translational means comprises a second set of threads on the shaft formed in an opposite direction to the threaded end of the shaft that engages the threaded hole in the base. The second set of threads engages internal threads in the mandrel. Consequently, when the shaft rotates, not only does the shaft move axially relative to the body, but the mandrel will move axially relative to the shaft.

DETAILED DESCRIPTION OF THE INVENTION

Figure 4:
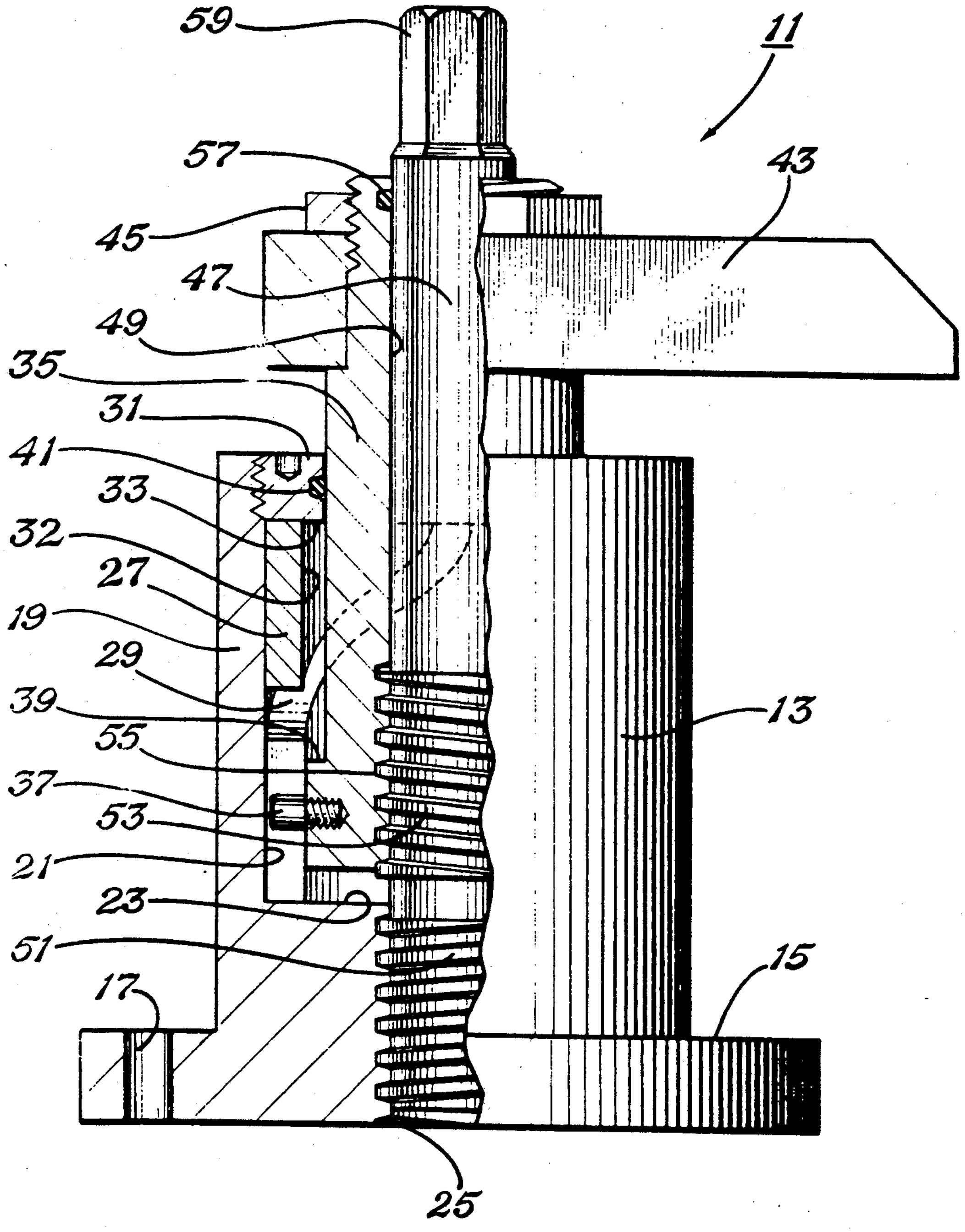
FIG. 4 is a vertical sectional view of the swing clamp of FIG. 1.

Referring to the Figures, particularly FIG. 4, swing clamp 11 has a body 13. Body 13 is a tubular member with a flat base 15. Base 15 includes an external flange with a plurality of holes 17. The holes 17 allow the body 13 to be bolted to various fixtures used in machining operations.

Body 13 also has a cylindrical sidewall 19 that extends upward from base 15. Sidewall 19 defines a cavity 21. The bottom 23 of cavity 21 is the upper side of base 15. A threaded hole 25 is formed in the base. The hole 25 is located on a longitudinal axis of the sidewall 19.

Figure 1:
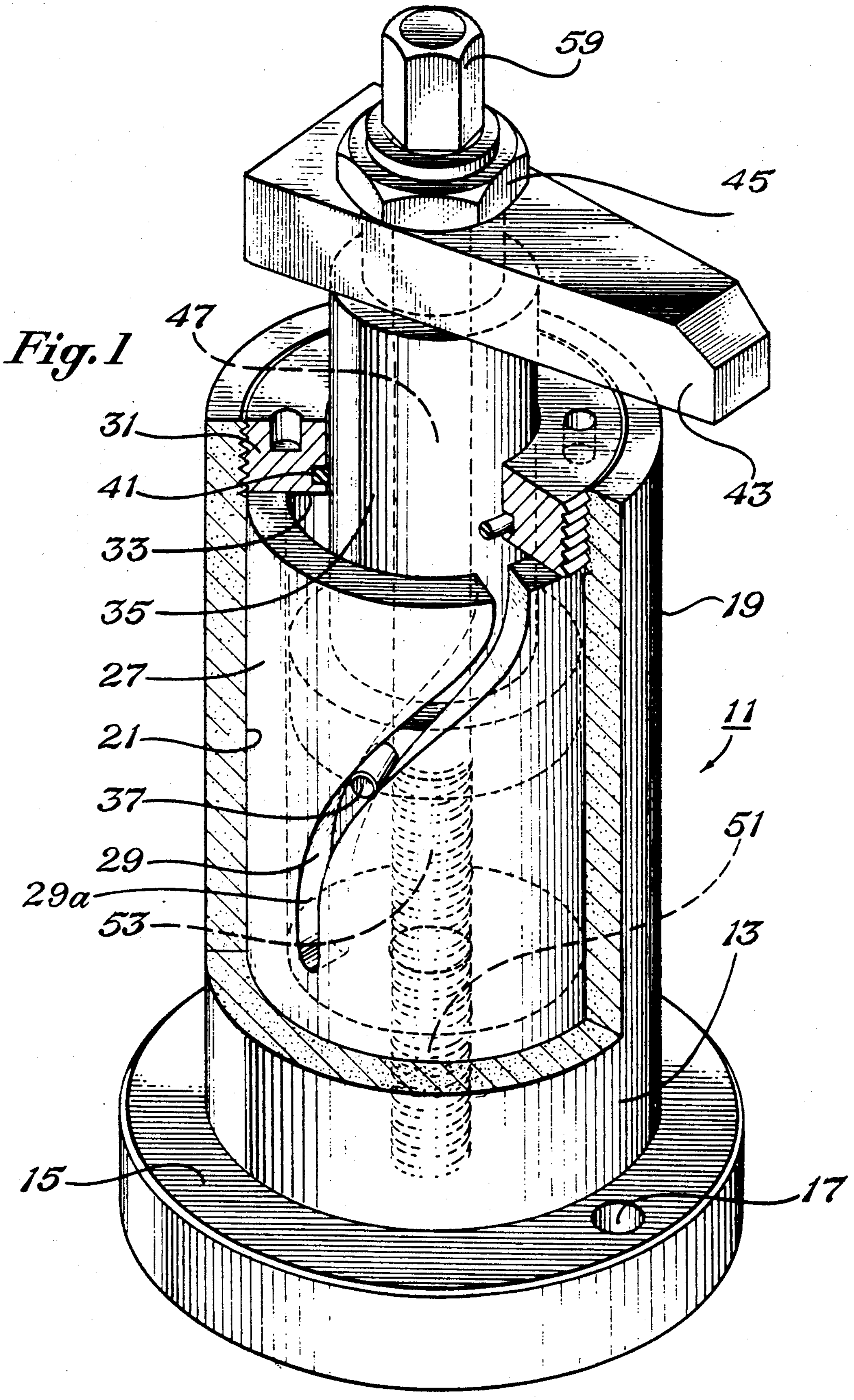
FIG. 1 is a perspective view of a swing clamp constructed in accordance with this invention, with portions broken away.

A cam sleeve 27 is stationarily mounted inside the cavity 21. Cam sleeve 27 is a cylindrical member. Its outer diameter contacts the inner diameter of the cylindrical sidewall 19. A cam slot 29 is formed in the cam sleeve 27. As shown clearly in FIG. 1, cam slot 29 extends upward and circumferentially in a curved, helical manner. The upper end of cam slot 29 is at the upper end of cam sleeve 27. The circumferential distance from the upper end to the lower end of the cam slot 29 is about 90 degrees. The lower portion *29a* of cam slot 29 extends vertically a significant distance parallel with the axis of the cam sleeve 27.

A stop ring 31 secures by threads to the upper end of the sidewall 19. Stop ring 31 bears against the upper end of the cam sleeve 27 to frictionally hold it stationarily in cavity 21. The stop ring 31 also defines the upper end of the cam slot 29. The stop ring 31 has a greater radial thickness than the thickness of the cam sleeve 27. Stop ring 31 extends radially inward a short distance past the inner diameter 32 of the cam sleeve 27. This results in a downward facing shoulder 33 that is perpendicular to the axis of cavity 21.

A mandrel 35 is carried in the cavity 21. Mandrel 35 is a holloW tubular member that can rotate relative to the body 13 as well as move upward and downward relative to the body 13. A cam follower or pin 37 extends radially outward from mandrel 35. Cam pin 37 locates within the cam slot 29. If the mandrel 35 is moved axially, either upward or downward, the cam pin 37 and cam slot 29 will force the mandrel 35 to rotate about 90 degrees between the upper and lower positions. Mandrel 35 thus moves linearly as well as rotationally.

Mandrel 35 has an exterior upward facing shoulder 39. Shoulder 39 will contact the downward facing shoulder 33 and define an upper limit of travel of the mandrel 35. The shoulders 33 and 39 will contact each other before the pin 37 reaches the upper end of slot 29. A seal 41 seals the exterior of mandrel 35 to the interior of stop ring 31. The lower end of mandrel 35 will contact the cavity bottom 23 to define the lower limit of travel. This occurs before the pin 37 reaches the bottom of slot 29.

A clamp member 43 secures to the upper end of mandrel 35. Clamp member 43 is a flat member that extends radially outward in one direction from the mandrel 35. A nut 45 engages threads on the upper end of mandrel 35 to secure the clamp member 43 to the mandrel 35. The nut 45 prevents the clamp member 43 from rotating relative to the mandrel 35.

A shaft 47 extends through a bore 49 in the mandrel 35. Shaft 47 is coaxial with the axis of the cavity 21. Shaft 47 has a set of lower threads 51 on its lower end. Lower threads 51 engage the threads of the threaded hole 25.

A set of upper threads 53 will be formed a short distance above the lower threads 51 on the shaft 47. Upper threads 53 are formed in the opposite direction. That is, if the lower threads 51 are right-hand threads, then the upper threads 53 will be left-hand threads.

The upper threads 53 engage a mating set of threads 55 in the bore 49 of mandrel 35. If the lower threads 51 are right hand, then rotating the shaft 47 in a counterclockwise direction, as seen from above, will cause the shaft 47 to move upward relative to base 15. It will also cause the mandrel 35 to move upward relative to the shaft 47.

A seal 57 seals the shaft 47 to the mandrel 35. The upper end of shaft 47 has a drive head 59, which is preferably polygonal. Drive head 59 will be of a conventional size to be engaged by various tools.

In operation, the base 15 will be bolted to a fixture of some type. To clamp a work piece (not shown) to the fixture, the shaft 47 must be rotated. This can be handled manually by an operator using a wrench to engage drive head 59. Also, the rotation of the shaft 47 could be by a driving tool held and powered by a spindle of a machine tool or by a robotically manipulated rotary actuator.

As the shaft 47 rotates to clamping position, the shaft 47 will extend deeper into the threaded hole 25. The shaft 47 thus moves axially downward into the base 15. At the same time, the oppositely turned threads 53 will cause the mandrel 35 to move downward toward the bottom 23. This causes the clamp 43 to move downward toward the base 15 in unison with mandrel 35.

As the mandrel 35 moves axially downward, it will also rotate 90 degrees. This rotation results because of the cam pin 37 in the cam slot 29. As the mandrel 35 rotates, the clamp member 43 will swing. After reaching 90 degrees, the mandrel 35 and clamp member 43 will move toward base 15 without rotation. This movement occurs as the cam pin 37 moves in the vertical portion 29*a* of the cam slot 29. The clamp member 43 will contact and grip the work piece before the mandrel 35 contacts the cavity bottom 23. Preferably, the clamp member 43 will not contact the work piece until the clamp member 43 has swung the full 90 degrees and started downward toward base 15 without rotation.

Figure 2:
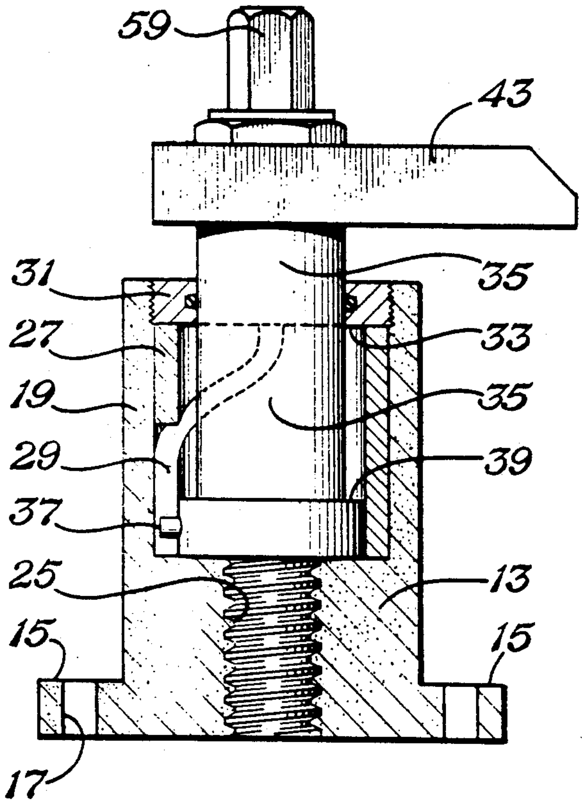
FIG. 2 is a partially sectioned view of the swing clamp of FIG. 1, showing the clamp member in a lowermost position.
Figure 3:
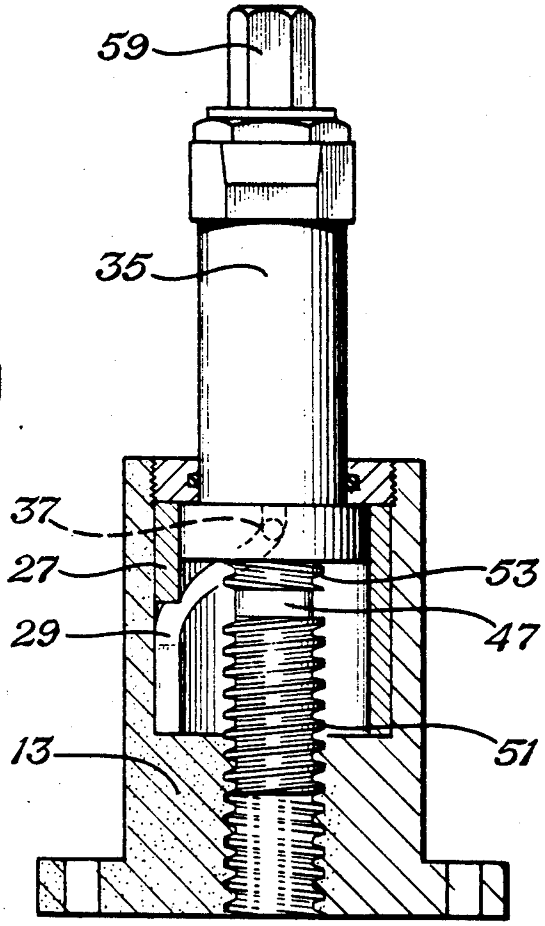
FIG. 3 is a partially sectioned view of the swing clamp of FIG. 1, showing the clamp member in an uppermost position.

The shaft 47 will rotate several turns during the movement of the mandrel 35 from its upper position shown in FIG. 3 to its lowermost position shown in FIG. 2. The amount of rotation required for the shaft 47 depends on the pitch of the threads 51, 53.

To release the clamp 11, the shaft 47 will be rotated in the opposite direction. This causes the shaft 47 to move upward relative to base 15. It causes the mandrel 35 to move upward relative to shaft 47. The cam slot 29 causes the mandrel 35 to move upward without rotation while the cam pin 37 is in portion 29*a*, then to move upward with rotation. The clamp member 43 will swing 90 degrees during this upward movement. The release position is shown in FIG. 3.

If the shaft 47 is rotated by a robotically manipulated rotary actuator, or by a spindle of a machine tool, sensing means can sense when increased torque occurs at the upper limit of the travel of the mandrel 35. This increased torque occurs when the shoulder 39 contacts the shoulder 33. Similarly, when moving to the clamping position, the automated equipment will sense an increased torque when the clamp member 43 bears against the work piece. If no work piece is present, when moving to the closed position, the lower end of the mandrel 35 will contact the cavity bottom 23. This will result in an increased torque which can be sensed.

The invention has significant advantages. The swing clamp is easily movable between released and clamped positions by operator or by automated equipment. This allows the swing clamp to remain with the fixture as the fixture is moved from various stations. There is no need for connecting power sources to the clamp. This allows operations to be carried on when an operator is not in attendance. Numerical controlled equipment can select the appropriate driving tool and actuate the swing clamp at the required time in the machining cycle. Loading and unloading of the parts from the fixture also may be automated utilizing this invention.

While the invention has been shown in only one of its forms, it should be apparent to those skilled in the art that it is not so limited, but is susceptible to various changes without departing from the scope of the invention.

I claim:

1. A swing clamp for clamping a work piece, comprising in combination:

a body having a base, the base having a threaded hole therein, the body having a longitudinal axis;

a tubular mandrel carried by the body and having an end extending therefrom;

a clamp member mounted to the end of the mandrel for movement therewith, the clamp member extending radially from the mandrel;

a shaft extending through the mandrel, the shaft having a threaded end which engages the threaded hole in the base, the shaft being rotatable relative to the mandrel and the clamp;

translational means for causing rotational movement of the shaft relative to the body to move the mandrel in axial directions relative to the body; and guide means for causing the mandrel and clamp member to rotate a selected amount relative to the body as the mandrel moves in axial directions, so that rotation of the shaft causes the clamp member to move between a released position and a clamping position, clamping the work piece between the base and the clamp member.

2. The swing clamp according to claim 1 wherein the guide means comprises:

a cam sleeve stationarily mounted to the body, the mandrel being carried within the cam sleeve and rotatable relative to the cam sleeve;

a curved cam slot formed in the cam sleeve; and a cam follower extending radially from the mandrel into the cam slot, causing the mandrel to rotate relative to the cam sleeve as the cam follower travels in the cam slot when the mandrel moves in axial directions.

3. The swing clamp according to claim I wherein the shaft has a drive head for engagement by a tool to rotate the shaft.

4. A swing clamp for clamping a work piece, comprising in combination:

a body having a base, the base having a threaded hole therein, the body having a longitudinal axis;

a mandrel carried by the body and having an end extending therefrom;

a clamp member mounted to the end of the mandrel for movement therewith, the clamp member extending radially from the mandrel;

a shaft extending through the mandrel, the shaft having a threaded end which engages the threaded hole in the base, the shaft being rotatable relative to the mandrel;

translational means for causing rotational movement of the shaft relative to the body to move the mandrel in axial directions relative to the body;

guide means for causing the mandrel and clamp member to rotate a selected amount relative to the body as the mandrel moves in axial directions, so that rotation of the shaft causes the clamp member to move between a released position and a clamping position, clamping the work piece between the base and the clamp member;

a shoulder formed on the exterior of the mandrel; and a stop ring mounted to the body and spaced axially from the threaded hole for contact by the shoulder to define a maximum limit of axial travel for the mandrel.

5. A swing clamp for clamping a work piece, comprising in combination:

a body having a base, the base having a threaded hole therein, the body having a longitudinal axis;

a mandrel carried by the body and having an end extending therefrom;

a clamp member mounted to the end of the mandrel for movement therewith, the clamp member extending radially from the mandrel;

a shaft extending through the mandrel, the shaft having a threaded end which engages the threaded hole in the base, the shaft being rotatable relative to the mandrel;

translational means for causing rotational movement of the shaft relative to the body to move the mandrel in axial directions relative to the body;

guide means for causing the mandrel and clamp member to rotate a selected amount relative to the body as the mandrel moves in axial directions, so that rotation of the shaft causes the clamp member to move between a released position and a clamping position, clamping the work piece between the base and the clamp member; and wherein the translational means comprises:

a set of internal threads in the mandrel formed in an opposite direction to the threaded hole in the base; and a second set of threads on the shaft formed in an opposite direction to the threaded end of the shaft, the second set of threads engaging the internal threads in the mandrel, so that rotation of the shaft in one direction relative to the body causes the shaft to move axially relative to the body and at the same time causes the mandrel to move axially relative to the shaft.

6. A swing clamp for clamping a work piece, comprising in combination:

a body having a base, a side wall extending upward from the base, defining a cavity with the base forming the lower end of the cavity, the cavity having a longitudinal axis, the base having a threaded hole therein that is coaxial with the cavity;

a mandrel carried in the cavity and having an upper end protruding upward therefrom, the mandrel having a bore with a longitudinal axis that is coaxial with the longitudinal axis of the cavity;

a clamp member mounted to the upper end of the mandrel for movement therewith, the clamp member extending radially from the mandrel;

a shaft extending through the bore of the mandrel, the shaft having a lower threaded end which engages the threaded hole in the base, the shaft being rotatable relative to the mandrel and the clamp;

translational means for causing rotational movement of the shaft to move the mandrel up and down;

a cam sleeve stationarily mounted inside the cavity, the mandrel being carried within the cam sleeve and rotatable relative to the cam sleeve;

a cam slot formed in the cam sleeve and extending helically a selected distance; and a cam follower extending radially from the mandrel into the cam slot, causing the mandrel and clamp member to rotate relative to the cam sleeve as the cam follower travels in the cam slot when the mandrel moves upward and downward;

whereby rotation of the shaft causes the clamp member to move between a released position and a clamping position, clamping the work piece between the base and the clamp member.

7. The swing clamp according to claim 6 wherein the shaft has a drive head for engagement by a tool to rotate the shaft.

8. The swing clamp according to claim 6 further comprising:

an upward facing shoulder formed on the exterior of the mandrel; and a stop ring mounted to the body and spaced above the threaded hole in the base for contact by the shoulder to define a maximum limit of axial travel for the mandrel, the stop ring being positioned to be contacted by the shoulder prior to the cam follower reaching an end of the cam slot.

9. A swing clamp for clamping a work piece, comprising in combination:

a body having a base, a side wall extending upward from the base, defining a cavity with the base forming the lower end of the cavity, the cavity having a longitudinal axis, the base having a threaded hole therein that is coaxial with the cavity;

a mandrel carried in the cavity and having an upper end protruding upward therefrom, the mandrel having a bore with a longitudinal axis that is coaxial with the longitudinal axis of the cavity;

a clamp member mounted to the upper end of the mandrel for movement therewith, the clamp member extending radially from the mandrel;

a shaft extending through the bore of the mandrel, the shaft having a lower threaded end which engages the threaded hole in the base, the shaft being rotatable relative to the mandrel;

translational means for causing rotational movement of the shaft to move the mandrel up and down;

a cam sleeve stationarily mounted inside the cavity, the mandrel being carried within the cam sleeve and rotatable relative to the cam sleeve;

a cam slot formed in the cam sleeve and extending helically a selected distance;

a cam follower extending radially from the mandrel into the cam slot, causing the mandrel and clamp member to rotate relative to the cam sleeve as the cam follower travels in the cam slot when the mandrel moves upward and downward;

whereby rotation of the shaft causes the clamp member to move between a released position and a clamping position, clamping the work piece between the base and the clamp member; and wherein the shaft has a vertical axis, and wherein the cam slot has a vertical portion at its lower end that extends parallel with the axis of the shaft, so that the clamp member will move downward a selected distance without rotation as the mandrel nears its lower limit of travel.

10. A swing clamp for clamping a work piece, comprising in combination:

a body having a base and a longitudinal axis, the base having a threaded hole therein:

a mandrel carried by the body and having an upper end protruding upward therefrom, the mandrel having a bore with a longitudinal axis that is coaxial with the longitudinal axis of the body;

a clamp member mounted to the upper end of the mandrel for movement therewith, the clamp member extending radially from the mandrel;

a shaft extending through the bore of the mandrel, the shaft having a lower end with a set of lower threads which engages the threaded hole in the base, the shaft being rotatable relative to the mandrel;

a set of internal threads in the mandrel formed in an opposite direction to the threads of the threaded hole in the base;

a set of upper threads on the shaft formed in an opposite direction to the lower threads on the shaft, the upper threads being spaced above the lower threads and engaging the internal threads in the mandrel, so that rotation of the shaft in one direction relative to the body causes the shaft to move upward relative to the body and at the same time causes the mandrel to move upward relative to the shaft;

a cam sleeve stationarily mounted to the body, the mandrel being carried within the cam sleeve and rotatable relative to the cam sleeve;

a cam slot formed in the cam sleeve and extending helically a selected distance; and a cam follower extending radially from the mandrel into the cam slot, causing the mandrel to rotate relative to the cam sleeve and the clamp member to swing as the cam follower travels in the cam slot when the mandrel moves upward and downward;

whereby rotation of the shaft causes the clamp member to move between a released position and a clamping position, clamping the work piece the clamp member.

11. The swing clamp according to claim 10 wherein the shaft has a drive head for engagement by a tool to rotate the shaft.

12. The swing clamp according to claim 10 further comprising:

an upward facing shoulder formed on the exterior of the mandrel; and a stop ring mounted to the body and spaced above the threaded hole in the base for contact by the shoulder to define a maximum limit of travel for the mandrel, the stop ring being positioned to be contacted by the shoulder prior to the cam follower reaching an end of the cam slot.

13. The swing clamp according to claim 10 wherein the body has a side wall extending upward from the base, defining a cavity, the cam sleeve being carried within the cavity.

* * * * *